United States Patent
Chung et al.

(10) Patent No.: US 9,469,759 B2
(45) Date of Patent: Oct. 18, 2016

(54) THERMOPLASTIC RESIN COMPOSITION AND MOLDED ARTICLE USING THE SAME

(71) Applicant: Cheil Industries Inc., Gumi-si (KR)

(72) Inventors: Taek-Woong Chung, Uiwang-si (KR); In-Chol Kim, Uiwang-si (KR); Chang-Min Hong, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/412,306

(22) PCT Filed: Dec. 18, 2012

(86) PCT No.: PCT/KR2012/011041
§ 371 (c)(1),
(2) Date: Dec. 31, 2014

(87) PCT Pub. No.: WO2014/007442
PCT Pub. Date: Jan. 9, 2014

(65) Prior Publication Data
US 2016/0002455 A1    Jan. 7, 2016

(30) Foreign Application Priority Data

Jul. 4, 2012  (KR) .................. 10-2012-0072948

(51) Int. Cl.
| *C08J 5/00* | (2006.01) |
| *C08L 25/14* | (2006.01) |
| *C08L 33/12* | (2006.01) |
| *C08L 33/10* | (2006.01) |
| C08L 51/04 | (2006.01) |

(52) U.S. Cl.
CPC ........ *C08L 33/12* (2013.01); *C08J 5/00* (2013.01); *C08L 25/14* (2013.01); *C08L 33/10* (2013.01); *C08J 2325/14* (2013.01); *C08J 2333/12* (2013.01); *C08J 2425/14* (2013.01); *C08J 2433/12* (2013.01); *C08J 2447/00* (2013.01); *C08J 2451/04* (2013.01); *C08L 51/04* (2013.01); *C08L 2205/03* (2013.01); *C08L 2205/035* (2013.01); *C08L 2207/04* (2013.01); *C08L 2207/53* (2013.01)

(58) Field of Classification Search
CPC .... C08L 33/12; C08L 25/14; C08L 2207/04; C08L 2207/53; C08L 2205/035; C08J 5/00; C08J 2333/12; C08J 2325/14; C08J 2433/12; C08J 2425/14; C08J 2447/00; C08J 2451/04
See application file for complete search history.

(56) References Cited

U.S. PATENT DOCUMENTS

| 4,526,929 | A | 7/1985 | Kishida et al. |
| 4,528,330 | A | 7/1985 | Kishida et al. |
| 7,019,049 | B1 | 3/2006 | Yoo et al. |
| 7,514,502 | B2 | 4/2009 | Kim et al. |
| 8,314,182 | B2 | 11/2012 | Ha et al. |
| 8,344,043 | B2* | 1/2013 | Jin .......................... C08L 25/14 523/122 |
| 8,367,770 | B2 | 2/2013 | Ha et al. |
| 2009/0043047 | A1* | 2/2009 | Ha ........................ C08F 285/00 525/77 |
| 2012/0264871 | A1 | 10/2012 | Moon et al. |
| 2014/0142212 | A1 | 5/2014 | Chu et al. |

FOREIGN PATENT DOCUMENTS

| CN | 101360770 | | 2/2009 |
| CN | 101360787 | | 2/2009 |
| JP | 57-036146 | A | 2/1982 |
| JP | 2011-132528 | A | 7/2011 |
| KR | 10-2001-0108464 | A | 12/2001 |
| KR | 10-2002-0003484 | A | 1/2002 |
| KR | 10-2004-0105464 | A | 12/2004 |
| KR | 10-2007-0108008 | A | 11/2007 |
| KR | 10-2007-0117315 | A | 12/2007 |
| KR | 10-2010-0045830 | A | 5/2010 |
| KR | 10-2011-0056080 | A | 5/2011 |
| KR | 10-2011-0078044 | A | 7/2011 |
| KR | 10-2012-0040771 | A | 4/2012 |
| WO | 00/60007 | A1 | 10/2000 |
| WO | 2011/081278 | | 7/2011 |
| WO | 2014/007442 | A1 | 1/2014 |

OTHER PUBLICATIONS

International Search Report in counterpart International Application No. PCT/KR2012/011041 dated Apr. 22, 2013, pp. 1-7.
Search Report in counterpart Chinese Application No. 201280075600.3 dated Apr. 13, 2016, pp. 1-2.

* cited by examiner

*Primary Examiner* — Vu A Nguyen
(74) *Attorney, Agent, or Firm* — Additon, Higgins & Pendleton, P.A.

(57) ABSTRACT

Provided is a thermoplastic resin composition that comprises (A) a graft copolymer; (B) a polyalkyl (meth)acrylate; (C) an alkyl (meth)acrylate-aromatic vinyl-vinyl cyanide copolymer; and (D) an impact-reinforcing agent, wherein the graft copolymer (A) comprises an aromatic vinyl compound-vinyl cyanide compound copolymer grafted on a core part comprising a rubbery polymer.

11 Claims, No Drawings

THERMOPLASTIC RESIN COMPOSITION AND MOLDED ARTICLE USING THE SAME

CROSS-REFERENCE TO RELATED APPLICATIONS

This application claims priority to and the benefit of International Application No. PCT/KR2012/011041, filed Dec. 18, 2012, which published as WO 2014/007442 on Jan. 9, 2014, and Korean Patent Application No. 10-2012-0072948, filed in the Korean Intellectual Property Office on Jul. 4, 2012, the entire disclosure of each of which is incorporated herein by reference.

TECHNICAL FIELD

A thermoplastic resin composition and a molded article using the same are disclosed.

BACKGROUND ART

In general, an ABS resin obtained by graft-copolymerizing styrene and an acrylonitrile monomer with a butadiene-based rubbery polymer has excellent impact resistance and moldability and also, excellent mechanical strength, thermal distortion temperature or the like, and satisfactory coloring properties and thus, is widely used for an electrical/electronic appliances, automotive parts, office supplies, and the like. However, the ABS resin has chemically unstable double bonds in its rubber component and thus, has a problem of very weak weather resistance, since the rubber component is easily aged by an ultraviolet (UV) ray. An attempt to improve the problem by adding an ultraviolet stabilizer thereto during the extrusion process has been made, but has a little effect and still causes weak properties about the ultraviolet (UV) ray. Accordingly, various methods of improving this problem have been suggested, and particularly, a method of using a chemically stable acrylic-based rubber instead of a butadiene rubber, a method of using a rubbery polymer obtained polymerizing butadiene and an acrylic-based polymerizable monomer and the like have been widely used.

The ASA (acrylate-styrene-acrylonitrile) graft copolymer resin obtained by graft-copolymerizing the styrene and the acrylonitrile monomer into the acrylic-based rubbery polymer has been widely used for an interior/exterior part for vehicles, farm equipments and the like or particularly electrical/electronic appliances requiring weather resistance.

The ASA resin has no chemically unstable double bonds and thus, no particular effect on weather resistance. However, the ASA resin has a problem of deteriorating impact resistance. In order to solve this problem, a method of increasing a diameter of a rubber particle, decreasing a gel content of the rubbery polymer, or the like has been used. However, these methods deteriorate appearance properties such as gloss as well as have difficulties in controlling properties of a graft copolymer. In addition, in order to improve impact resistance, gloss and the like, a method of preparing each acrylic-based rubbery polymer having a different average particle diameter and mixing them is used but has no sufficient result.

The ASA resin is a terpolymer of acrylate-styrene-acrylonitrile and has excellent weather resistance, chemical resistance, and thermal stability and thus, is widely used for outdoor electrical/electronic parts, automotive parts, building and sports goods, and the like but lacks of coloring properties and impact resistance at a low temperature or room temperature and is extremely limitedly applied to parts for electrical/electronic appliances, farm equipments, automotive parts. Recently, researches on preparing a weather resistant resin having small property change depending on a temperature condition and excellent coloring properties to satisfy these requirements have been made.

In general, the ASA resin is also called to be a ASA terpolymer and variously used due to excellent weather resistance and chemical resistance and in particular, is widely used for an object mainly used outside and requiring weather resistant discoloring, chemical resistance, thermal stability and the like, for example, electrical/electronic parts, a building material, a material for a farm equipment, an ASA/ABS double sheet, profile extrusion, a road sign, outdoor goods, building/interior goods, leisure/daily supplies, sports goods, automotive parts, and the like. The ASA resin is mainly applied to a satellite antenna, a kayak paddle, a chassis joiner, a door panel, a side-mirror housing and the like. In particular, the ASA resin is increasingly demanded as a building material due to recent restriction about a vinyl chloride resin and gentrification in a building material market and gradually more widely used as a chassis profile and a roof finishing material as well as a conventional chassis joiner.

Accordingly, development of an ASA resin having excellent weather resistance, impact resistance, and coloring properties is required.

DISCLOSURE

Technical Problem

One embodiment provides a thermoplastic resin composition having improved coloring properties, and excellent scratch resistance and impact resistance.

Another embodiment provides a molded article using the thermoplastic resin composition.

Technical Solution

In one embodiment, a thermoplastic resin composition comprises (A) an graft copolymer; (B) a polyalkyl (meth)acrylate; (C) an alkyl (meth)acrylate-aromatic vinyl-vinyl cyanide copolymer; and (D) an impact-reinforcing agent, wherein the graft copolymer (A) comprises an aromatic vinyl compound-vinyl cyanide compound copolymer grafted on a core part comprising a rubbery polymer and a styrene copolymer.

The graft copolymer (A) may comprise 40 to 70 wt % of the core part and 30 to 60 wt % of the grafted aromatic vinyl compound-vinyl cyanide compound copolymer.

The aromatic vinyl compound-vinyl cyanide compound copolymer may comprise 60 to 80 wt % of an aromatic vinyl compound and 20 to 40 wt % of a vinyl cyanide compound.

The graft copolymer may comprise a rubbery polymer having double structure core layers of an internal core layer comprising an alkyl acrylate-aromatic vinyl copolymer and an external core layer comprising an alkyl acrylate-based polymer; and an aromatic vinyl compound-vinyl cyanide compound copolymer grafted into the rubbery polymer having double structure core layers.

The alkyl acrylate-aromatic vinyl copolymer may comprise 20 to 80 wt % of an alkyl acrylate compound and 80 to 20 wt % of an aromatic vinyl compound.

The rubbery polymer of the double structure core layer may comprise 10 to 50 wt % of an internal core layer and 90 to 50 wt % of an external core layer.

The alkyl acrylate may be butyl acrylate.

The thermoplastic resin composition may comprise (A) 5 to 50 wt % of the graft copolymer; (B) 10 to 80 wt % of the polyalkyl (meth)acrylate; (C) 20 to 50 wt % of the alkyl (meth)acrylate-aromatic vinyl-vinyl cyanide copolymer; and (D) 5 to 15 wt % of the impact-reinforcing agent.

The polyalkyl (meth)acrylate (B) and the alkyl (meth)acrylate-aromatic vinyl-vinyl cyanide copolymer (C) may be used in a weight ratio of 1:1 to 3:1.

The alkyl (meth)acrylate-aromatic vinyl-vinyl cyanide copolymer (C) may be a methyl(meth)acrylate-styrene-acrylonitrile copolymer.

The impact-reinforcing agent may be an alkyl (meth)acrylate-butadiene-styrene (MBS) based copolymer.

The thermoplastic resin composition may further comprise an additive comprising a dye, a pigment, a flame retardant, a filler, a stabilizer, a lubricant, an antibacterial agent, a release agent or a combination thereof.

In another embodiment, a molded article manufactured using the thermoplastic resin composition is provided.

Advantageous Effects

The thermoplastic resin composition has excellent high coloring properties, scratch resistance and impact resistance.

BEST MODE

Hereinafter, embodiments are described in detail. However, these embodiments are exemplary, and do not limit the present invention, and the present invention is defined by the scope of the claims which will be described later.

In the present specification, when specific definition is not otherwise provided, "substituted" refers to one substituted with a halogen (F, Cl, Br, I, and the like), a hydroxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C1 to C20 alkoxy group, a C6 to C30 aryl group, a C6 to C30 aryloxy group, a C3 to C30 cycloalkyl group, a C3 to C30 cycloalkenyl group, a C3 to C30 cycloalkynyl group, or a combination thereof instead of hydrogen of a compound.

In the present specification, when specific definition is not otherwise provided, "(meth)acrylate" refers to both "acrylate" and "methacrylate". In addition, "(meth)acrylic acid alkyl ester" refers to both "acrylic acid alkyl ester" and "methacrylic acid alkyl ester", and "(meth)acrylic acid ester" refers to both "acrylic acid ester" and "methacrylic acid ester".

In the present specification, "*" refers to a linking part between the same or different atoms, or Chemical Formulae.

A thermoplastic resin composition according to one embodiment comprises (A) an graft copolymer; (B) a polyalkyl (meth)acrylate; (C) a alkyl (meth)acrylate-aromatic vinyl-vinyl cyanide copolymer; and (D) an impact-reinforcing agent, wherein the graft copolymer (A) comprises an aromatic vinyl compound-vinyl cyanide compound copolymer grafted on a core part comprising a rubbery polymer.

The thermoplastic resin composition comprises the graft copolymer (A) and the polyalkyl (meth)acrylate (B) and thus, shows excellent scratch resistance, also comprises the alkyl (meth)acrylate-aromatic vinyl-vinyl cyanide copolymer (C) and realizes improved coloring properties, and simultaneously, comprises the impact-reinforcing agent (D) and shows excellent impact resistance. Accordingly, the thermoplastic resin composition may be variously applied to an exterior material for an automotive, a housing for electrical appliances, and the like. Hereinafter, each component comprised in the thermoplastic resin composition is specifically illustrated.

(A) Graft Copolymer

The graft copolymer is a copolymer in which an aromatic vinyl compound-vinyl cyanide compound copolymer is grafted into a rubbery polymer and specifically, a copolymer in which the aromatic vinyl compound-vinyl cyanide compound copolymer is grafted into a core part comprising the rubbery polymer.

The rubbery polymer may be a polymer of a diene-based rubber, an acrylate-based rubber or a silicone-based rubber.

The diene-based rubber may be a butadiene rubber, an ethylene/propylene rubber, a styrene/butadiene rubber, an acrylonitrile/butadiene rubber, an isoprene rubber, an ethylene-propylene-diene terpolymer (EPDM), and the like.

The acrylate-based rubber may be obtained by polymerization of an acrylate monomer such as methylacrylate, ethylacrylate, n-propylacrylate, n-butylacrylate, 2-ethylhexylacrylate, hexylmethacrylate, 2-ethylhexyl methacrylate and the like, wherein a usable hardener may be ethylene glycoldimethacrylate, propylene glycoldimethacrylate, 1,3-butylene glycoldimethacrylate or 1,4-butylene glycoldimethacrylate, allylmethacrylate, triallylcyanurate, and the like.

The aromatic vinyl compound may be styrene, alpha-methylstyrene, p-t-butylstyrene, 2,4-dimethylstyrene, vinyltoluene, and the like, which may be used singularly or in a mixture thereof.

The vinyl cyanide compound may be acrylonitrile, methacrylonitrile, and the like, which may be used singularly or in a mixture thereof.

The graft copolymer may comprise 40 to 70 wt % of the core part and 30 to 60 wt % of the grafted aromatic vinyl compound-vinyl cyanide compound copolymer.

The aromatic vinyl compound-vinyl cyanide compound copolymer may comprise 60 to 80 wt % of an aromatic vinyl compound and 20 to 40 wt % of a vinyl cyanide compound. When the aromatic vinyl compound is comprised in an amount of greater than 80 wt %, weather resistance is deteriorated by a photo-oxidation mechanism, and coloring properties are difficult to improve. On the other hand, when the aromatic vinyl compound is comprised in an amount of less than 60 wt %, polymerization stability is deteriorated, a large amount of a solidified product may be generated, and color and fluidity of a final molded article may be deteriorated.

According to one embodiment, the graft copolymer (A) may be a copolymer wherein a rubbery polymer having double structure core layers of an internal core layer comprising an alkyl acrylate-aromatic vinyl copolymer and an external core layer comprising an alkyl acrylate-based polymer; and an aromatic vinyl compound-vinyl cyanide compound copolymer grafted into the rubbery polymer having double structure core layers.

The internal core layer comprises a copolymer of alkyl acrylate and an aromatic vinyl compound to improve coloring properties. In general, a weather resistant resin has a problem of coloring property deterioration due to a large refractive index difference between a grafted aromatic vinyl compound-vinyl cyanide compound copolymer and a SAN (styrene-acrylonitrile) resin comprised in a matrix and light scattering according to lack of gloss deteriorates, but as aforementioned, the coloring properties of the resin may be improved by introducing an aromatic vinyl compound into an internal core and thus, improving the refractive index.

The internal core layer may comprise a copolymer obtained by copolymerizing 20 to 80 wt % of an alkyl acrylate compound and 80 to 20 wt % of an aromatic vinyl compound. Specifically, the internal core layer may be a copolymer comprising 20 to 50 wt % of the alkyl acrylate compound and 50 to 80 wt % of the aromatic vinyl compound. When the compounds are comprised within the range, coloring properties and impact resistance may be improved.

In addition, since the external core layer wraps an aromatic vinyl component of the internal core, an effect of increasing a glass transition temperature may be suppressed, and accordingly, coloring properties may be improved due to increase of a refractive index, and low temperature impact resistance may be improved due to increase of the glass transition temperature. The external core layer is uniformly polymerized on the surface of the internal core and thus, wraps the internal core by using alkyl acrylate, a grafting agent and a cross-linking agent and resultantly, may suppress the aromatic monomer of the internal core from increasing the glass transition temperature.

The external core layer may comprise an alkyl acrylate-based polymer. The rubbery polymer of the double structure core layers may comprise 10 to 50 wt % of the internal core layer and 90 to 50 wt % of the external core layer. Alkyl of the alkyl acrylate may be C1 to C10, for example, butyl acrylate.

In addition, the rubbery polymer of the double structure core layers may have an average particle diameter ranging from 0.1 to 0.3 µm, comprise gel in an amount of 85 to 98 wt %, and have a swelling index ranging from 10 to 25. When the particle diameter is smaller than 0.1 µm, efficiency of the alkyl acrylate rubber applying an impact-reinforcing effect may be deteriorated, while when the particle diameter is larger than 0.3 µm, the impact-reinforcing effect is a little increased, but gloss and coloring properties of a final molded article may be deteriorated.

The graft copolymer may be comprised in an amount of 5 to 50 wt % and specifically, 10 to 25 wt % in a thermoplastic resin composition. When the copolymer is comprised within the range, excellent impact resistance characteristics and coloring properties may be obtained.

(B) Polyalkyl (Meth)Acrylate

The polyalkyl (meth)acrylate is strong against a hydrolysis and thus, may improve scratch resistance of a thermoplastic resin composition.

The polyalkyl (meth)acrylate may be obtained by polymerization of a raw monomer comprising alkyl (meth)acrylate using a well-known polymerization method such as a suspension polymerization method, a massive polymerization method, an emulsion polymerization method and the like.

The alkyl (meth)acrylate may have a C1 to C10 alkyl group, and may be methyl (meth)acrylate, ethyl (meth)acrylate, butyl (meth)acrylate, glycidyl (meth)acrylate, hydroxyethyl (meth)acrylate, and the like.

For example, the polyalkyl (meth)acrylate may be comprised in an amount of 10 to 80 wt % and specifically, 20 to 60 wt % in the thermoplastic resin composition. When the polyalkyl (meth)acrylate is comprised within the range, excellent scratch resistance and heat resistance may be secured.

Raw monomers for the polyalkyl (meth)acrylate may further comprise a vinyl-based monomer other than the alkyl (meth)acrylate. The vinyl-based monomer may comprise an aromatic vinyl monomer such as styrene, α-methylstyrene, ρ-methylstyrene and the like; a vinyl cyanide compound monomer such as acrylonitrile, methacrylonitrile and the like as a single or a mixture thereof.

The polyalkyl (meth)acrylate may have a weight average molecular weight ranging from 10,000 to 200,000 g/mol and specifically, 30,000 to 150,000 g/mol. When the polyalkyl (meth)acrylate has a weight average molecular weight within the range, the polyalkyl (meth)acrylate has excellent compatibility with the above graft copolymer (A) and thus, excellent hydrolytic resistance, scratch resistance, moldability and the like.

In addition, the polyalkyl (meth)acrylate may adjust balance between scratch resistance and heat resistance characteristics as well as improve transparency of a molded article manufactured by adjusting its ratio with the alkyl (meth)acrylate-aromatic vinyl-vinyl cyanide copolymer (C). Herein, the polyalkyl (meth)acrylate and the alkyl (meth)acrylate-aromatic vinyl-vinyl cyanide copolymer (C) may have a weight ratio ranging from 1:1 to 3:1, for example, 1:1 to 1.5:1.

(C) Alkyl (Meth)Acrylate-Aromatic Vinyl-Vinyl Cyanide Copolymer

The alkyl (meth)acrylate-aromatic vinyl-vinyl cyanide copolymer is a terpolymer prepared by polymerizing a (meth)acrylic acid alkyl ester monomer or a (meth)acrylic acid ester monomer, an aromatic vinyl compound monomer and a vinyl cyanide compound monomer.

The alkyl (meth)acrylate-aromatic vinyl-vinyl cyanide copolymer may be prepared in a method of emulsion polymerization, suspension polymerization, solution polymerization, or mass polymerization and improves a refractive index of the polyalkyl (meth)acrylate (B) and thus, decreases a refractive index difference between a rubbery polymer of the graft copolymer (A) and the polyalkyl (meth)acrylate (B) and ultimately, improves transparency and coloring properties.

The alkyl (meth)acrylic acid alkyl ester which is an alkyl (meth)acrylic acid alkyl ester monomer may be C1 to C10 alkyl (meth)acrylate. For example, methylmethacrylate, ethylmethacrylate, propylmethacrylate, butyl methacrylate, pentylmethacrylate, hexylmethacrylate, heptylmethacrylate, octylmethacrylate, methylacrylate, ethylacrylate, propylacrylate, butylacrylate, pentylacrylate, hexylacrylate, heptylacrylate, octylacrylate, and the like may be used, and these may be used singularly or in a mixture of two or more.

The aromatic vinyl compound monomer may be selected from the group consisting of styrene, o-ethyl styrene, m-ethyl styrene, p-ethyl styrene, alphamethyl styrene and a combination thereof.

The vinyl cyanide compound monomer may be selected from the group consisting of acrylonitrile, methacrylonitrile, ethacrylonitrile and a combination thereof.

Specifically, examples of the alkyl (meth)acrylate-aromatic vinyl-vinyl cyanide copolymer may be a copolymer of acrylonitrile, styrene and ethyl methacrylate, or a copolymer of acrylonitrile, styrene and methyl methacrylate. For example, the alkyl (meth)acrylate-aromatic vinyl-vinyl cyanide copolymer may be a copolymer comprising 10 to 30 wt % of the acrylonitrile, 40 to 80 wt % of styrene and 10 to 30 wt % of methyl methacrylate.

The alkyl (meth)acrylate-aromatic vinyl-vinyl cyanide copolymer may have a weight average molecular weight ranging from 30,000 to 200,000 g/mol, for example, 50,000 to 150,000 g/mol. When the weight average molecular weight is within the range, impact resistance characteristics and compatibility are excellent.

The alkyl (meth)acrylate-aromatic vinyl-vinyl cyanide copolymer may be comprised in an amount of 20 to 50 wt % and specifically, 25 to 40 wt % in a thermoplastic resin composition. When the alkyl (meth)acrylate-aromatic vinyl-vinyl cyanide copolymer is comprised within the range, coloring properties are excellent.

In addition, the alkyl (meth)acrylate-aromatic vinyl-vinyl cyanide copolymer is used with the polyalkyl (meth)acrylate (B) and thus, may adjust scratch resistance as well as improve transparency of a molded article. Herein, the polyalkyl (meth)acrylate and the alkyl (meth)acrylate-aromatic vinyl-vinyl cyanide copolymer may be used in a weight ratio of 1:1 to 3:1, for example, 1:1 to 1.5:1.

(D) Impact-Reinforcing Agent

As for the impact-reinforcing agent, a graft copolymer may be used. The graft copolymer may be prepared by polymerizing at least one rubber monomer selected from a diene-based rubber, an acrylate-based rubber and a silicone-based rubber monomer and then, grafting at least one kind of graft-copolymerizable monomer selected from the group consisting of styrene, alpha-methyl styrene; alkyl-substituted styrene; acrylonitrile; methacrylonitrile; methyl methacrylate; maleic anhydride; alkyl or phenyl nuclear-substituted maleimide and the like into the rubbery polymer, and the impact-reinforcing agent may comprise 20 to 80 parts by weight of a rubber.

As for the diene-based rubber, butadiene is used as a representative monomer, and isoprene and the like may be applied thereto. The acrylate-based rubber may comprise a monomer such as methyl acrylate, ethyl acrylate, n-propyl acrylate, n-butyl acrylate, 2-ethylhexyl acrylate, hexyl methacrylate, 2-ethylhexyl metacrylate and the like. The silicone-based rubber may be manufactured from cyclosiloxane, and the cyclosiloxane may comprise, for example, hexamethyl cyclotrisiloxane, octamethyl cyclotetrasiloxane, decamethyl cyclopentasiloxane, dodecamethyl cyclohexasiloxane, trimethyltriphenyl cyclotrisiloxane, tetramethyl tetraphenyl cyclotetrosiloxane, octaphenyl cyclotetrasiloxane, and the like. At least one selected from the cyclosiloxanes may be used as a silicone-based rubber. A polyolefin-based rubber such as an ethylene/propylene rubber, an ethylene-propylene-diene terpolymer (EPDM) and the like may be used other than the cyclosiloxane.

According to one embodiment, the graft copolymer as an impact-reinforcing agent may be a methyl methacrylate-butadiene-styrene (MBS) copolymer. The methyl methacrylate-butadiene-styrene-based copolymer has greater than or equal to 70% increased particle diameter compared with that of the butadiene-based rubber polymer, and herein, the butadiene-based rubber polymer has a particle diameter ranging from 0.1 to 0.3 µm. The impact-reinforcing agent may be comprised in an amount of 5 to 15 wt % and for example 7 to 15 wt % in a thermoplastic resin. Within the range, compatibility may not be deteriorated and impact resistance may also be improved.

(E) Other Additive

The thermoplastic resin composition may further comprise an additional additive to further provide injection molding properties, property balance and the like.

For example, the thermoplastic resin composition may further comprise an additive such as a dye, a pigment, a flame retardant, a filler, a stabilizer, a lubricant, an antibacterial agent, a release agent and the like, and these additives may be used as a single or a mixture of more than two thereof.

The additives may be comprised within an appropriate range unless properties of a thermoplastic resin composition are deteriorated and specifically, in an amount of 0 to 3.0 wt % in the thermoplastic resin composition.

Hereinbefore, each component of the thermoplastic resin composition and its prefigurative amount are illustrated but may be appropriately used by considering its inherent characteristics depending on properties of a final thermoplastic resin composition.

The thermoplastic resin composition may be prepared in a well-known method of preparing a resin composition. For example, each component according to one embodiment and other additives are simultaneously mixed and melt-extruded through an extruder and then, manufactured into a pellet.

According to another embodiment, a molded article is provided by molding the above thermoplastic resin composition. The molded article specifically may have a large, complex or thin structure requiring mechanical properties, thermal characteristics and molding properties and more specifically, an exterior material for automotive and the like.

MODE FOR INVENTION

Hereinafter, the embodiments are illustrated in more detail with reference to examples. These examples, however, are not in any sense to be interpreted as limiting the scope of the invention.

EXAMPLE

Each component used to prepare thermoplastic resin compositions of the following Examples are as follows.

(A) Graft Copolymer

A double core-sell-shaped graft ASA resin was prepared by graft emulsion-polymerizing 50 parts by weight of a monomer mixture comprising 33 wt % of acrylonitrile and 67 wt % of styrene into 50 parts by weight of a butyl acrylate rubber having a double core structure comprising an internal core formed of copolymerized butyl acrylate and styrene and an external core formed of a butyl acrylate rubber.

(A-1) Graft Copolymer

A bi-modal type graft ASA resin having mixed rubber particle diameters 0.5 to 0.6 µm and 0.1 to 0.2 µm was obtained by graft emulsion-polymerizing 40 parts by weight of a monomer mixture of 33 wt % of acrylonitrile and 67 wt % of styrene into 60 parts by weight of a butyl acrylate rubber.

(B) Polymethyl Metacrylate

A PMMA resin synthesized by using a methyl metacrylate monomer was used. The PMMA had a weight average molecular weight of about 120,000 g/mol.

(C) Methyl Methacrylate-Styrene-Acrylonitrile Copolymer

A MSAN resin comprising 20 wt % of acrylonitrile, 65 wt % of styrene, and 15 wt % of methacrylate and having a weight average molecular weight of about 100,000 g/mol was used.

(D) Impact-Reinforcing Agent (MBS)

A MBS resin comprising 25 wt % of methyl metacrylate, 70 wt % of butadiene and 5 wt % of styrene was used.

Example 1 and Comparative Examples 1 to 4

Each thermoplastic resin composition according to Example 1 and Comparative Examples 1 to 4 was prepared to respectively have a composition provided in the following Table 1.

The components (A) to (D) in the following Table 1 were mixed, the mixture was supplied at a speed of 60 kg/hr and then, extruded/processed by using a twin-screw extruder having a screw rpm of 250, a diameter of 45 mm, and L/D=36 at 230° C., manufacturing a pellet-shaped thermoplastic resin. The pellet was dried at 100° C. for greater than or equal to 4 hours and then, injection molded at 230° C., manufacturing a specimen.

TABLE 1

|  | Example (wt %) | Comparative Example (wt %) | | | |
|---|---|---|---|---|---|
|  | 1 | 1 | 2 | 3 | 4 |
| (A) | 18.2 | 27.3 | 18.2 | 18.2 |  |
| (A-1) |  |  |  |  | 27.3 |
| (B) | 43.6 | 43.6 | 72.7 |  | 43.6 |
| (C) | 29.1 | 29.1 |  | 72.7 | 29.1 |
| (D) | 9.1 |  | 9.1 | 9.1 |  |

Properties of the specimens were measured in the following method.

Experimental Example 1

Mechanical Properties

Properties of the specimens were measured in the following method, and the results are provided in the following Table 2.
(1) Haze: measured with a reference to ASTM D1003.
(2) IZOD (Impact strength): measured by ASTM D256 (notched 1/8" specimen).
(3) MI (melt index): measured by ASTM D1238.
(4) BSP (Ball type Scratch Profile) width: roughness was observed, and a scratch width was measured by using a surface profiler after respectively applying a load of 300 g, 500 g and 1,000 g with a spherical tungsten carbide stylus having a diameter of 0.7 mm according to a Cheil method and then, applying a scratch on the specimens at a speed of 75 mm/min.

TABLE 2

|  | Example (wt %) | Comparative Example (wt %) | | | |
|---|---|---|---|---|---|
|  | 1 | 1 | 2 | 3 | 4 |
| HAZE (2T) | 26 | 28 | 45 | 60 | 98 |
| IZOD (1/8") | 8 | 5 | 6 | 5 | 7 |
| MI (220° C., 10 kg) | 6.8 | 5 | 6.0 | 13.0 | 8 |
| BSP (1 kg) | 288 (F) | 277 (F) | 260 (H) | 299 (HB) | 296 (HB) |

As shown in Table 1, Comparative Example 1 comprising no impact-reinforcing agent shows excellent transparency but weak impact strength and scratch resistance, low fluidity and thus, unsatisfactory moldability.

In addition, Comparative Example 2 showed remarkably deteriorated transparency. The reason is that a specimen using a thermoplastic resin comprising the (A-1) graft copolymer showed deteriorated transparency.

Comparative Example 3 comprised no (B) polyalkyl (meth)acrylate and thus, showed remarkably deteriorated transparency and impact strength, and Comparative Example 4 showed unsatisfactory transparency.

On the other hand, Example 1 related to a thermoplastic resin comprising an graft copolymer (A), a methyl (meth)acrylate copolymer (B), a methyl (meth)acrylate-aromatic vinyl-vinyl cyanide copolymer (C) and an impact-reinforcing agent (D). Example 1 comprised the methyl (meth)acrylate-aromatic vinyl-vinyl cyanide copolymer (C) and thus, further increased refractive index of the methyl (meth)acrylate copolymer (B) and decreased refractive index difference of a thermoplastic resin and ultimately improved transparency. In addition, Example 1 showed all excellent results in scratch resistance, impact resistance and the like as well as in a haze evaluation.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:
1. A thermoplastic resin composition comprising
   (A) a graft copolymer;
   (B) a polyalkyl (meth)acrylate;
   (C) an alkyl (meth)acrylate-aromatic vinyl-vinyl cyanide copolymer; and
   (D) an impact-reinforcing agent,
   wherein the graft copolymer (A) comprises an aromatic vinyl compound-vinyl cyanide compound copolymer grafted on a core part comprising a rubbery polymer, wherein the graft copolymer (A) comprises 40 to 70 wt% of the core part and 30 to 60 wt% of the grafted aromatic vinyl compound-vinyl cyanide compound copolymer, and wherein the impact-reinforcing agent is an alkyl (meth)acrylate-butadiene-styrene (MBS) based copolymer.
2. The thermoplastic resin composition of claim 1, wherein the aromatic vinyl compound-vinyl cyanide compound copolymer comprises 60 to 80 wt % of an aromatic vinyl compound and 20 to 40 wt % of a vinyl cyanide compound.
3. The thermoplastic resin composition of claim 1, wherein the graft copolymer comprises a rubbery polymer of double structure core layers comprising an internal core layer comprising an alkyl acrylate-aromatic vinyl copolymer and an external core layer comprising an alkyl acrylate-based polymer; and an aromatic vinyl compound-vinyl cyanide compound copolymer grafted into the rubbery polymer of double structure core layers.
4. The thermoplastic resin composition of claim 3, wherein the alkyl acrylate-aromatic vinyl copolymer comprises 20 to 80 wt % of an alkyl acrylate compound and 80 to 20 wt % of an aromatic vinyl compound.
5. The thermoplastic resin composition of claim 3, wherein the rubbery polymer of the double structure core layer comprises 10 to 50 wt % of an internal core layer and 90 to 50 wt % of an external core layer.
6. The thermoplastic resin composition of claim 3, wherein the alkyl acrylate is butyl acrylate.
7. The thermoplastic resin composition of claim 1, comprising:
   (A) 5 to 50 wt % of the graft copolymer;
   (B) 10 to 80 wt % of the polyalkyl (meth)acrylate;
   (C) 20 to 50 wt % of the alkyl (meth)acrylate-aromatic vinyl-vinyl cyanide copolymer; and
   (D) 5 to 15 wt % of the impact-reinforcing agent.
8. The thermoplastic resin composition of claim 1, wherein the polyalkyl (meth)acrylate (B) and the alkyl (meth)acrylate-aromatic vinyl-vinyl cyanide copolymer (C) are comprised in a weight ratio of 1:1 to 3:1.

9. The thermoplastic resin composition of claim 1, wherein the alkyl (meth)acrylate-aromatic vinyl-vinyl cyanide copolymer (C) is a methyl(meth)acrylate-styrene-acrylonitrile copolymer.

10. The thermoplastic resin composition of claim 1, wherein the thermoplastic resin composition further comprises an additive comprising a dye, a pigment, a flame retardant, a filler, a stabilizer, a lubricant, an antibacterial agent, a release agent or a combination thereof.

11. A molded article manufactured using the thermoplastic resin composition of claim 1.

* * * * *